March 15, 1932.    A. DUTTON    1,850,003
PRODUCTION OF PHOTOGRAPHIC TRANSPARENCIES FOR PRINTING
Filed Feb. 27, 1931    3 Sheets-Sheet 1

INVENTOR
Arthur Dutton,
BY
ATTORNEYS.

March 15, 1932.　　　　　A. DUTTON　　　　　1,850,003

PRODUCTION OF PHOTOGRAPHIC TRANSPARENCIES FOR PRINTING

Filed Feb. 27, 1931　　3 Sheets-Sheet 2

INVENTOR
Arthur Dutton
BY
ATTORNEY

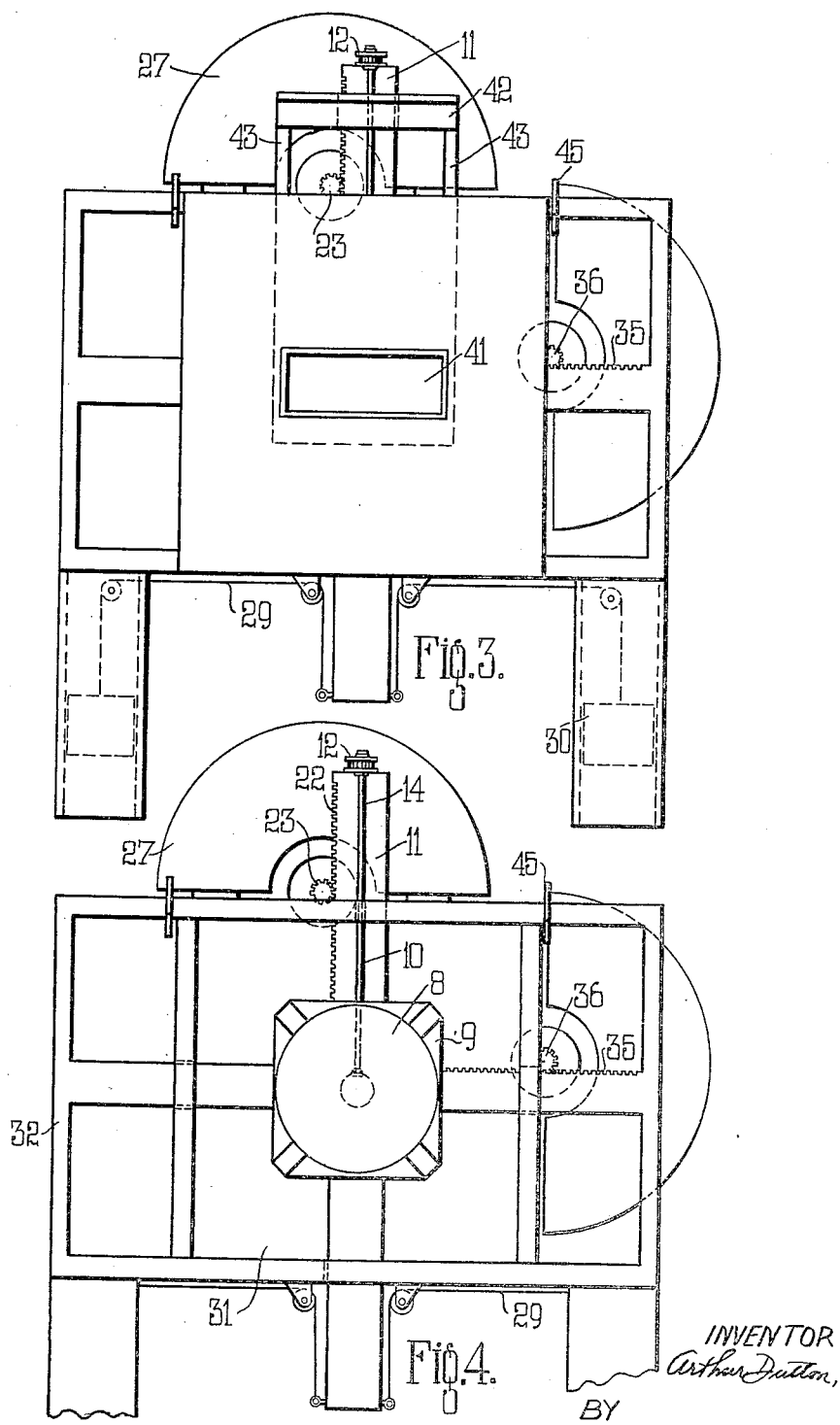

Patented Mar. 15, 1932

1,850,003

UNITED STATES PATENT OFFICE

ARTHUR DUTTON, OF LIVERPOOL, ENGLAND, ASSIGNOR TO PHOTOLINE LIMITED, OF LIVERPOOL, ENGLAND, A BRITISH COMPANY

PRODUCTION OF PHOTOGRAPHIC TRANSPARENCIES FOR PRINTING

Application filed February 27, 1931, Serial No. 518,822, and in Great Britain March 17, 1930.

The present invention relates to improvements in photographic cameras, more particularly suitable for process work.

According to the present invention, a holder for a sensitized sheet, plate, or the like may be rotated in its own plane, and further may be displaced in its own plane in two directions at right angles to one another, these motions being relative to the shutter of the camera.

Further a mask, the aperture of which is adjustable in size and position may be interposed between the plate and the camera.

The invention is more particularly described with reference to the accompanying drawings in which:—

Figure 3 is a front elevation with the bellows and lens removed.

Figure 4 is a view similar to Figure 3, but with the plate or the like holder, removed.

Figure 1:
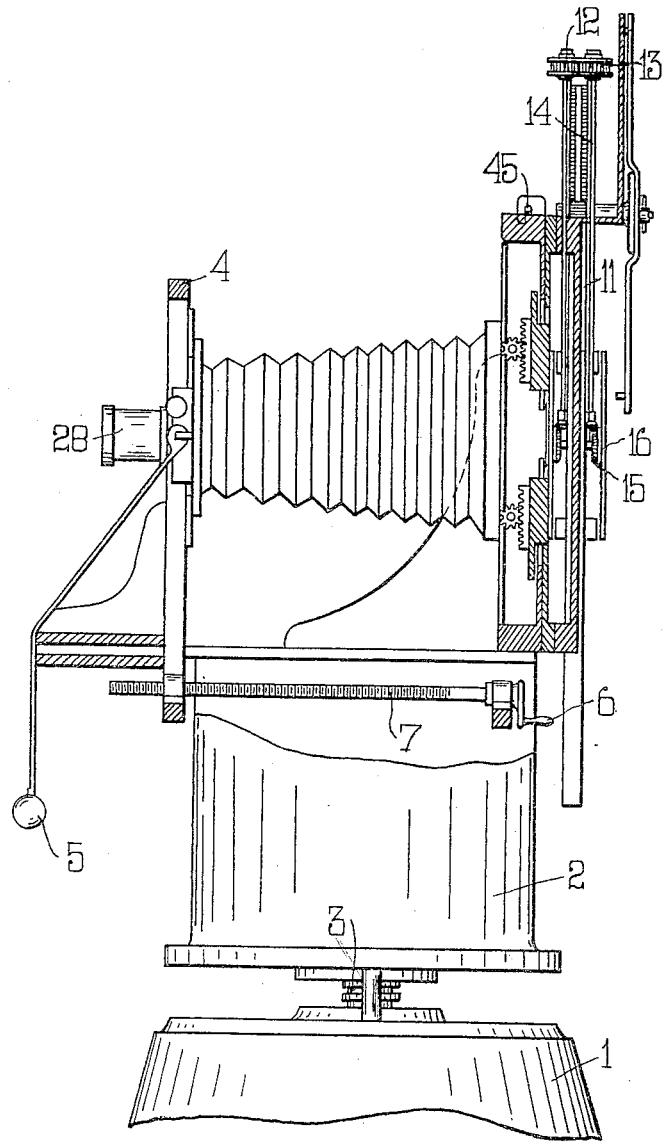
Figure 1 is a side view of one form of construction of the camera, partly in section.
Figure 2:
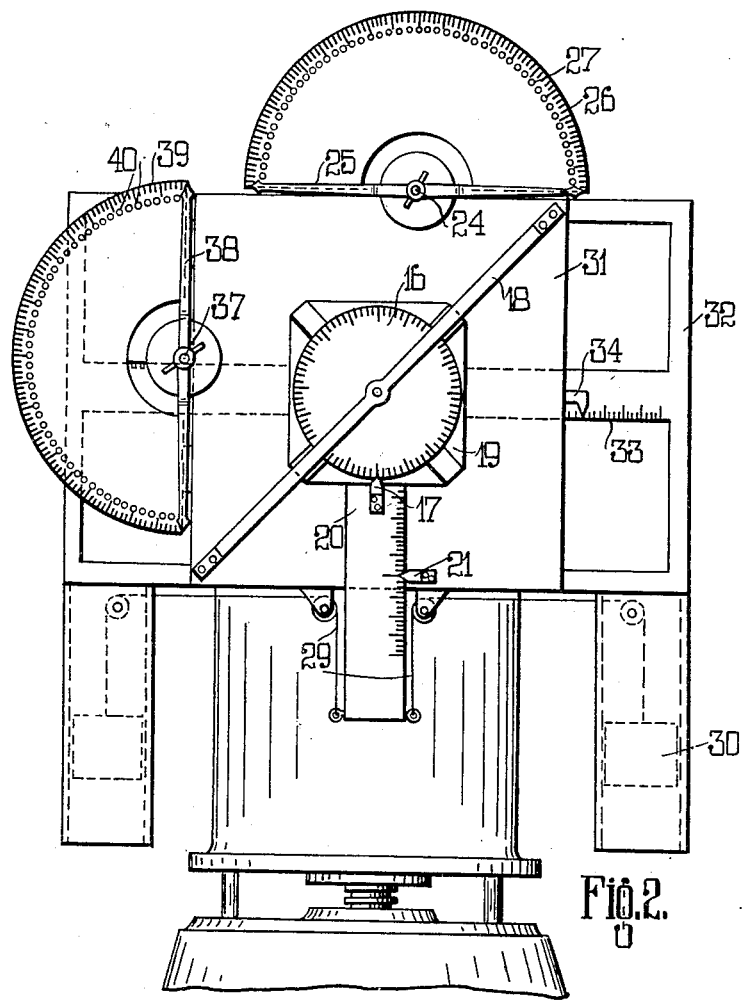
Figure 2 is a corresponding rear elevation.
Figures 5, 6:
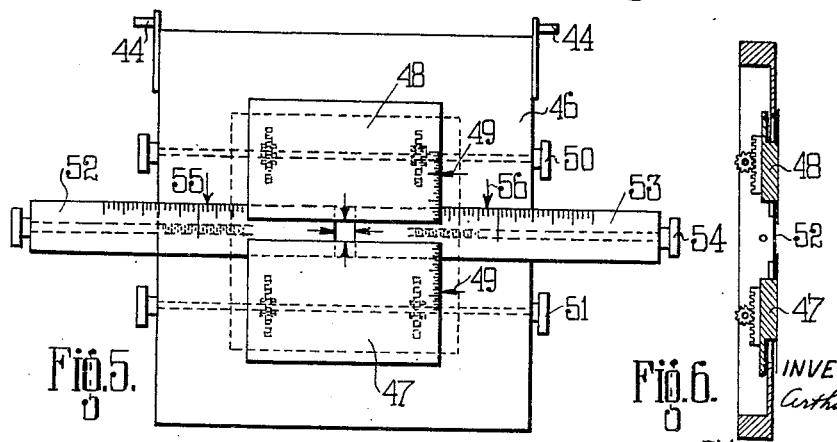
Figure 5 is a front elevation of masking plate.
Figure 6 is a corresponding side view partly in section.

The camera consists of a base 1 on which the frame 2 for the camera is mounted, and which can be raised and lowered relatively to the base 1 by means of screw-jack mechanism indicated at 3 which can be of any usual form.

The shutter of the camera is mounted on a shutter plate 4 and can be provided with any usual remote control release means 5. The focussing may be effected by means of a hand-wheel 6 and threaded spindle 7 to give any enlargement or reduction of reproduction of image as required.

The sensitized plate, film or the like, is adapted to be secured by clips upon a plate 8 rotatable in guides in a frame 9, by means of bevel wheels driven from a spindle 10 mounted in guides on a slide 11, which spindle 10 has a gear wheel 12 meshing with another gear wheel 13 on a parallel spindle 14 similarly driven by bevel wheels 15, the crown wheel of which is mounted on a plate 16 having a graduated periphery co-operating with a fixed index 17 and a fixed rule 18.

It will consequently be seen that any rotation of the plate 16 will cause similar rotation of the photographic plate mounted on the base 8.

The carrier 19 for the plate 16 is integral with a slide 20 graduated on one side to co-operate with an index 21, which slide 20 is connected to the slide 11 having a rack edge 22 engaging with a pinion 23 on the spindle 24, which has frictionally clamped to it a double pointer 25 adapted to move over a micrometer scale 26. The pointer 25 has a spring catch adapted to engage with one or other of a number of perforations 27, so that its position can be accurately adjusted. It will be seen therefore, that adjustments of height of the sensitized plate relatively to the camera lens 28 will be indicated as a coarse adjustment on the indicator 21, and as a fine adjustment on the indicator 27.

The weight of the slides, plate-holder and the like parts can be counter-balanced by means of flexible cords or the like 29 and weights 30.

Similarly the frame 31 carrying the plate-holder 9 and its adjustment parts set forth above can be slidable in guides on the sub-frame 32, which is provided with a graduated edge 33 co-operating with a pointer 34, the opposite element of this frame 32 having a rack edge 35 engaging with a pinion 36 on a spindle 37, which can be frictionally clamped to a double indicating pointer 38 co-operating with a scale 39 which has perforations 40 engaging the spring pin or the like on the indicator pointer 38.

It will be seen therefore, that adjustments of the plate-holder 9 in horizontal plane relatively to the lens 28 are indicated as coarse adjustments on the scale 33, and fine adjustments on the scale 39.

The front bar of the plate-holder has an aperture 41 adapted to be closed by a dark slide withdrawable by means of a yoke 42 and guide rods 43.

It will be preferred to provide a mask between the plate-holder and the camera. This mask is detachable and is carried by pins 44 engaging with sockets 45 on the camera frame, so that it can be folded down into position, or folded back out of the camera field, as required.

This masking plate comprises a frame 46 having a pair of masks 47, 48, sliding in guides in the frame 46 provided with graduated edges co-operating with indicating pointers 49. The displacement of these masks may be effected by means of handwheels 50, 51, operating the slides 48, 47 respectively through rack and pinion gearing.

The width of the aperture may be adjusted by means of mask slides 52, 53, operated by means of threaded spindles 54 which mask slides 52, 53, operated with indicating pointers 55, 56, respectively.

Any suitable lens may be used and if desired this may be replaceable so that, for instance, a distorting lens may be employed for obtaining modified images of an object photographed.

I declare that what I claim is:

1. A photographic camera comprising a plate-holder, a rotary guideway for said plate-holder, a longitudinal guideway for said rotary guideway, supports for said longitudinal guideway, a frame, a longitudinal guideway at right angles through said first guideway for said supports, a light-tight casing and means to displace said plate-holder about an axis at right angles to its plane or in any two directions at right angles in its own plane.

2. A photographic camera comprising a plate-holder, a rotary guideway for said plate-holder, a longitudinal guideway for said rotary guideway, supports for said longitudinal guideway, a frame, a longitudinal guideway at right angles through said first guideway for said supports, a rotary disc mounted externally to said light-tight casing, a frame having a circular guideway supporting said rotary disc, a longitudinal guide for said frame, supports for said longitudinal guideway, a second guideway at right angles to said first guideway for said supports and gearing between said rotary disc and said rotary plate-holder, and gearing between each guideway for said disc and each guideway for said plate-holder.

3. A photographic camera comprising a plate-holder, a rotary guideway for said plate-holder, a longitudinal guideway for said rotary guideway, supports for said longitudinal guideway, a frame, a longitudinal guideway at right angles through said first guideway for said supports, a rotary disc mounted externally to said light-tight casing, a frame having a circular guideway supporting said rotary disc, a longitudinal guide for said frame, supports for said longitudinal guideway, a second guideway at right angles to said first guideway for said supports, and gearing between said rotary disc and said rotary plate-holder, and gearing between each guideway for said disc and each guideway for said plate-holder, coarse and fine adjustments on each longitudinal guideway and frictional locking means for said fine adjustments.

In witness whereof, I have hereunto signed my name this 2nd day of February 1931.

ARTHUR DUTTON.